(12) United States Patent
Sugimoto et al.

(10) Patent No.: US 6,566,449 B2
(45) Date of Patent: May 20, 2003

(54) POLYMALEIMIDE-CONTAINING RUBBER COMPOSITION AND TIRE

(75) Inventors: Kenichi Sugimoto, Kodaira (JP); Masahiro Hojo, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/981,742

(22) Filed: Oct. 19, 2001

(65) Prior Publication Data

US 2002/0077423 A1 Jun. 20, 2002

(30) Foreign Application Priority Data

Oct. 19, 2000 (JP) ........................................ 2000-319362

(51) Int. Cl.[7] .................................................. C08F 8/32
(52) U.S. Cl. ........................ 525/180; 525/184; 525/190
(58) Field of Search ................. 525/190, 180, 525/184

(56) References Cited

U.S. PATENT DOCUMENTS 5,153,248 A 10/1992 Muse et al.

FOREIGN PATENT DOCUMENTS

| EP | 0 495 370 A1 | | 7/1992 |
|----|----|----|----|
| EP | 0 900 820 A1 | | 3/1999 |
| JP | 56-11917 | * | 2/1981 |
| JP | 58-125717 | * | 7/1983 |
| JP | 62-79243 | * | 4/1987 |
| JP | 3-100020 | * | 4/1991 |
| JP | 5-331261 | * | 12/1993 |
| JP | 7-61969 | | 3/1995 |

* cited by examiner

*Primary Examiner*—Ana Woodward
(74) *Attorney, Agent, or Firm*—Sughrue Mion, PLLC

(57) ABSTRACT

A rubber composition comprises at least one rubber ingredient selected from natural rubber and synthetic rubbers, and a polymaleimide synthesized by reacting at least one of anhydrous maleic acid and anhydrous citraconic acid with methylene polyaniline.

6 Claims, No Drawings

POLYMALEIMIDE-CONTAINING RUBBER COMPOSITION AND TIRE

BACKGROUND OF THE INVENTION

1. Field of the Invention

This invention relates to a polymaleimide-containing rubber composition and a tire using a rubber member made of such a rubber composition.

2. Description of Related Art

It is well-known that elastic modulus of a vulcanized rubber composition, particularly dynamic storage modulus (E') is improved by compounding bismaleimide with a rubber composition because bismaleimide acts as a crosslinking agent or the like in the rubber component. Furthermore, the crosslinking of bismaleimide is thermally stable, so that the heat resistance is simultaneously improved.

To this end, various tire performances are improved by using a bismaleimide-containing rubber composition in rubber member for a tire while utilizing characteristics of such a rubber composition.

For example, when a rubber composition is formed by compounding bismaleimide with styrene-butadiene copolymer rubber (SBR) and applied to a tread for the tire, the steering stability, high-speed durability, high-running performance and heat resistance are improved. And also, when silica is compounded with such a rubber composition, the wet-skid performance and rolling resistance are improved.

When a rubber composition is formed by compounding bismaleimide with natural rubber (NR) and applied to a casing member for the tire, since the elastic modulus is high, this composition acts as a strengthening material and contributes to reduce the weight of the tire, control the heat build-up and improve the rolling resistance, adhesion property between rubber and steel cord and fatigue durability.

However, when a large amount of bismaleimide is compounded, vulcanization reaction is obstructed and a long vulcanizing time is taken and hence the productivity undesirably lowers in a certain case. And also, there is caused an inconvenience that an easiness of bubble formation in rubber is degraded.

SUMMARY OF THE INVENTION

It is, therefore, an object of the invention to more improve the elastic modulus without damaging the productivity in order to more improve the tire performances.

Since bismaleimide is industrially expensive, it is difficult to be compounded in a large amount considering a cost of a final product, so that the invention is to attain the improvement of the elastic modulus by compounding a small amount of a maleimide-based compound.

According to the invention, there is the provision of a rubber composition comprising at least one rubber ingredient selected from natural rubber and synthetic rubbers, and a polymaleimide synthesized by reacting at least one of anhydrous maleic acid and anhydrous citraconic acid with methylene polyaniline represented by the following general formula (I):

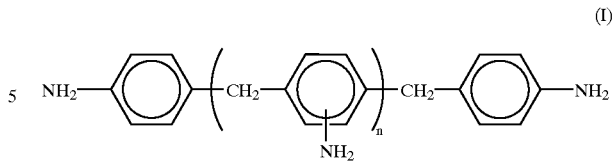

wherein n is an integer of 1 or more.

Further, the invention lies in a tire using a rubber member made of the above rubber composition. In this case, a gas to be filled in the tire may be air, nitrogen or the like.

DETAILED DESCRIPTION OF THE INVENTION

In general, bismaleimide bonds to a molecular chain of rubber through a double bond of a terminal maleimide unit to conduct the crosslinking, or plural bismaleimides are polymerized with each other through the double bond. In the latter case, since bismaleimide is resinified, the double bond is located in only both terminals of the resulting polymer, so that the number of reaction points to the molecular chain of rubber considerably decreases.

On the contrary, according to the invention, the polymaleimide having three or more reaction points is used, so that a large number of reaction points to the molecular chain of rubber still remain even after the resinification and can further contribute to the crosslinking. To this end, the increase of elastic modulus is large as compared with the system containing only bismaleimide. When the polymaleimide is mixed with the bismaleimide, the melting point is lowered as compared with the use of the bismaleimide alone, so that the dispersibility of both maleimides into rubber can be improved.

As mentioned above, in the polymaleimide according to the invention, the ratio of increasing the elastic modulus is larger than that of bismaleimide, so that when the polymaleimide is used in the same amount as in the case of using bismaleimide, the effect of improving the elastic modulus is more enhanced, and hence when the polymaleimide-containing rubber composition is applied to the tire, the steering stability and durability are more improved. In other words, even when the amount of the polymaleimide compounded is decreased for reducing a bad influence upon the productivity or the like, it is possible to maintain the elastic modulus and tire performances at a level equal to or more than those of bismaleimide, which contributes to decrease the cost.

The production method of the polymaleimide used in the invention is not particularly limited. For example, the polymaleimide can easily be produced by the method described in JP-A-7-61969. That is, it can be produced by addition-reacting polyamine with anhydrous maleic acid in an organic solvent and adding anhydrous acetic acid as a dehydrating agent to the resulting polymaleamic acid without isolation to conduct dehydrating ring closure reaction.

The rubber composition according to the invention is favorable to contain the polymaleimide in an amount of 0.1–10 parts by weight based on 100 parts by weight of the rubber ingredient. When the amount is less than 0.1 part by weight, the effect by the compounding of the polymaleimide may not sufficiently be obtained, while when it exceeds 10 parts by weight, the curing of rubber extremely proceeds in a certain case and hence the fracture resistance and productivity undesirably lower.

In the rubber composition according to the invention, the methylene polyaniline is favorable to contain 30–95% by weight of a binuclide component and 5–70% by weight of trinuclide or more components (components at n=1 or more in the formula (I)). When the trinuclide or more components are less than 5% by weight, it is difficult to obtain the sufficient improving effect, while when they are more than 70% by weight, the workability is degraded but also the cost undesirably rises in a certain case. More preferably, the methylene polyaniline contains 60–90% by weight of the binuclide component and 10–40% by weight of the trinuclide or more components.

In the rubber composition according to the invention, the rubber ingredient is favorable to contain not less than 50% by weight of styrene-butadiene copolymer (SBR) and/or contain not less than 50% by weight of natural rubber. When the rubber ingredient contains not less than 50% by weight of SBR or natural rubber, the improving effect by the polymaleimide aiming at the invention is clear.

As the synthetic rubber used in the invention, a diene rubber is preferable, which includes, for example, cis-1,4-polyisoprene, styrene-butadiene copolymer, low cis-1,4-polybutadiene, high cis-1,4-polybutadiene, ethylene-propylene-diene terpolymer, chloroprene, halogenated butyl rubber, acrylonitrile-butadiene rubber and the like.

As the rubber ingredient, it is favorable to use natural rubber, cis-1,4-polyisoprene, styrene-butadiene copolymer and polybutadiene. Moreover, natural rubber and the synthetic rubber may be used alone or in a blend of two or more.

In the invention, at least one of carbon black, silica, a powdery inorganic compound represented by a general formula (II) of $mM_1.xSiOy.zH_2O$ (wherein $M_1$ is at least one metal selected from the group consisting of Al, Mg, Ti and Ca, or an oxide or a hydroxide of such a metal, and m, x, y and z are integers of 1 to 5, 0 to 10, 2 to 5 and 0 to 10, respectively) and the like can be used as a reinforcing filler. Among them, carbon black and silica are favorable.

In the formula (II), when x and z are both zero, the inorganic compound is at least one selected from the group consisting of Al, Mg, Ti and Ca or an oxide or a hydroxide of such a metal.

As the inorganic compound represented by the formula (II), mention may be made of alumina ($Al_2O_3$), aluminum hydroxide ($Al(OH)_3$), magnesium hydroxide ($Mg(OH)_2$), magnesium oxide ($MgO_2$), talc ($3MgO.4SiO_2.H_2O$), attapulgite ($5MgO.8SiO_2.9H_2O$), titanium white ($TiO_2$), titanium black ($TiO_{2-1}$), calcium oxide (CaO), calcium hydroxide ($Ca(OH)_2$), magnesium aluminum oxide ($MgO.Al_2O_3$), clay ($Al_2O_3.2SiO_2$), kaolin ($Al_2O_3.2SiO_2.2H_2O$), pyrophyllite ($Al_2O_3.4SiO_2.2H_2O$), bentonite ($Al_2O_3.4SiO_2.2H_2O$), aluminum silicate (for example, $Al.SiO_5$, $Al_4.3SiO_4.5H_2O$), magnesium silicate (for example, $Mg_2SiO_4$, $MgSiO_3$), calsium silicate (for example, $Ca_2.SiO_4$), calcium aluminum silicate (for example, $Al_2O_3.CaO.SiO_2$), calcium magnesium silicate ($CaMgSiO_4$) and so on.

And also, the above aluminum hydroxide includes aluminum hydrate ($Al_2O_3.3H_2O$).

These inorganic compounds represented by the formula (II) may be used alone or in admixture of two or more. Among them, aluminum hydroxide is particularly preferable because the effect of improving the gripping force is conspicuous.

The inorganic compound is required to be powder having a particle size of 0.01–10 µm. When the particle size is less than 0.01 m, the operating efficiency in the kneading is degraded while the improvement of the gripping force is not expected, while when it exceeds 10 µm, the modulus of elasticity extremely lowers and the sufficient gripping force is not obtained even at the sacrifice of the wear resistance. In order to obtain advantageous effects at a high and well-balanced level, the particle size is preferably 0.05–5 µm, more particularly 0.1–3 Am.

The amount of the reinforcing filler compounded is favorable to be 20–150 parts by weight based on 100 parts by weight of the rubber ingredient. When the amount is less than 20 parts by weight, the fracture properties, wear resistance and the like of the resulting vulcanizate may be insufficient, while when it exceeds 150 parts by weight, the workability and the like may be undesirable. More preferably, the amount is 25–80 parts by weight.

As the carbon black used in the reinforcing filler, mention may be made of HAF, ISAF, SAF and the like. Moreover, when two or more of the fillers, for example, carbon black and silica are used together, the compounding ratio may optionally be varied in accordance with the compounding purpose.

The silica used in the invention is not particularly restricted and includes dry-type silica (silicic anhydride), wet-type silica (silicic hydrate) and so on. Particularly, the wet-type silica is favorable. As the preferable wet-type silica are mentioned Nipsil VN3, AQ and the like (Trade name, made by Nippon Silica Co., Ltd.). The silica has a nitrogen adsorption specific surface area ($N_2SA$) of 130–280 $m^2/g$. When $N_2SA$ is less than 130 $m^2/g$, the sufficient modulus of elasticity is not obtained and the wear resistance is degraded, while when it exceeds 280 $m^2/g$, the operating efficiency in the kneading is degraded while the improvement of the gripping force is not expected.

In addition to the above rubber ingredient, reinforcing filler and polymaleimide, the rubber composition according to the invention may be compounded with a silane coupling agent, a vulcanizing agent, a vulcanization accelerator, an antioxidant, an anti-ozone agent, a processing oil, zinc white (ZnO), stearic acid and the like, if necessary.

As the vulcanizing agent used in the invention, mention may be made of sulfur and the like. The amount of the vulcanizing agent used is 0.1–10 parts by weight based on 100 parts by weight of the rubber ingredient as a sulfur content. When the amount is less than 0.1 part by weight, the fracture properties and wear resistance of the vulcanizate lower, while when it exceeds 10 parts by weight, rubber elasticity tends to be lost. More preferably, the amount is 0.5–6.0 parts by weight.

As the processing oil used in the invention, mention may be made of paraffinic oil, naphthenic oil, aromatic oil and the like. The aromatic oil is used in applications taking more consideration on fracture properties and wear resistance, and the naphthenic oil or paraffinic oil is used in applications taking more consideration on low heat build-up and low temperature properties. The amount of the processing oil used is favorable to be not more than 100 parts by weight based on 100 parts by weight of the rubber ingredient. When the amount exceeds 100 parts by weight, the fracture properties and low heat build-up of the vulcanized rubber are considerably degraded is a certain case.

The vulcanization accelerator used in the invention is not particularly limited, but includes, for example, a benzothiazole based accelerator such as MBT (2-mercaptobenzothiazole), DM (dibenzothiazyl disulfide), CBS (N-cyclohexyl-2-benzothiazyl sulfenamide), TBBS (N-t-butyl-2-benzothiazyl sulfenamide), TBSI (N-t-butyl-2-benzothiazyl sulfenimide), or the like; a guanidine based accelerator such as DPG (diphenylguanidine) or the like; a thiuram based accelerator such as tetraoctylthiuram disulfide, tetrabenzylthiuram disulfide or the like; an accelerator such as zinc dialkyldithiophosphate or the like; and so on. The amount of the vulcanization accelerator used is 0.1–5 parts by weight, preferably 0.2–3 parts by weight based on 100 parts by weight of the rubber ingredient.

The invention is very effective in the rubber composition compounding benzothiazol based vulcanization accelerator and the tire using the same.

In the invention, the obstruction of the vulcanization reaction can be decreased by using the polymaleimide as compared with bismaleimide. Moreover, the blow point property is further improved by using a hydrazide compound represented by the following general formula (III) or (IV) or an amine compound represented by the following formula (V) or (VI):

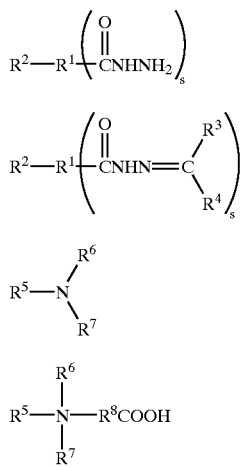

In the formula (III) or (IV), $R^1$ is an acyclic aliphatic group having a carbon number of 2–18, a cyclic aliphatic group having a carbon number of 5–20, an aromatic group having a carbon number of 6–18 or an alkylaromatic group having a carbon number of 7–24 and may contain at least one heteroatom of O, N and S, provided that the acyclic aliphatic group may contain an aromatic group therein, and $R^2$ is a hydrogen atom, a hydroxy group, an amino group or a mercapto group, and each $R^3$ and $R^4$ is a hydrogen atom, an alkyl group having a carbon number of 1–18, a cyclohexyl group or an aromatic group and may be the same or different and may contain at least one heteroatom of O, N and S, and s is an integer of 1–3.

In the formula (V), $R^5$ is a saturated or unsaturated alkyl group having a carbon number of 8–24, an aryl group having a carbon number of 6–24 or an aralkyl group having a carbon number of 7–24, and each of $R^6$ and $R^7$ is a hydrogen atom, a saturated or unsaturated alkyl group having a carbon number of 1–12, an aryl group having a carbon number of 6–12, an aralkyl group having a carbon number of 7–12,— $(CH_2O)_pH$, —$(CH_2CH_2O)_pH$, —$(CH(CH_3)CH_2O)_pH$ or —$(CH_2CH_2CH_2O)_pH$ and a total value of p in $R^6$ and $R^7$ is an integer of 1–4.

In the formula (VI), $R^5$ to $R^7$ are the same as in the formula (V), and $R^8$ is a saturated or unsaturated alkyl group having a carbon number of 6–24, an aryl group having a carbon number of 6–24 or an aralkyl group having a carbon number of 7–24.

As the hydrazide compound of the formula (III) or (IV), mention may be made of 1-hydroxy-N'-(1-methylethylidene)-2-naphthoic acid hydrazide, 1-hydroxy-N'-(1-methylpropylidene)-2-naphthoic acid hydrazide, 1-hydroxy-N'-(1-methylbutylidene)-2-naphthoic acid hydrazide, 1-hydroxy-N'-(1,3-dimethylbutylidene)-2-naphthoic acid hydrazide, 1-hydroxy-N'-(2,6-dimethyl-4-heptylidene)-2-naphthoic acid hydrazide, 1-hydroxy-N'-(2-furylmethylene)-2-naphthoic acid hydrazide, 3-hydroxy-N'-(1-methylethylidene)-2-naphthoic acid hydrazide, 3-hydroxy-N'-(1-methylpropylidene)-2-naphthoic acid hydrazide, 3-hydroxy-N'-(1-methylbutylidene)-2-naphthoic acid hydrazide, 3-hydroxy-N'-(1,3-dimethylbutylidene)-2-naphthoic acid hydrazide, 2-hydroxy-N'-(2,6-dimethyl-4-heptylidene)-3-naphthoic acid hydrazide, 2-hydroxy-N'-(2-furylmethylene)-3-naphthoic acid hydrazide, isophthalic acid di(1-methylethylidene) hydrazide, isophthalic acid di(1-methylpropylidene) hydrazide, isophthalic acid di(1,3-dimethylbutylidene) hydrazide, isophthalic acid di(2,6-dimethyl-4-heptylidene) hydrazide, isophthalic acid di(2-furylmethylene) hydrazide, isonicotinic acid (1-methylethylidene) hydrazide, isonicotinic acid (1-methylpropylidene) hydrazide, isonicotinic acid (1-methylbutylidene) hydrazide, isonicotinic acid (2,6-dimethyl-4-heptylidene) hydrazide, isonicotinic acid (1,3-dimethylbutylidene) hydrazide, isonicotinic acid (2-furylmethylene) hydrazide, N'-(1-methylethylidene)-salycylic acid hydrazide, N'-(1-methylpropylidene)-salycylic acid hydrazide, N'-(1-methylbutylidene)-salycylic acid hydrazide, N'-(1,3-dimethylbutylidene)-salycylic acid hydrazide, N'-(2,6-dimethyl-4-heptylidene)-salycylic acid hydrazide, N'-(2-furylmethylene)-salycylic acid hydrazide or semicarbazide, carbohydrazide, oxalic acid dihydrazide, malonic acid dihydrazide, succinic acid dihydrazide, glutaric acid dihydrazide, adipic acid dihydrazide, pymellic acid dihydrazide, suberic acid dihydrazide, azelaic acid dihydrazide, sebacic acid dihydrazide, 1,12-dodecane dicarboxylic acid dihydrazide, 1,16-hexadecane dicarboxylic acid dihydrazide, terephthalic acid dihydrazide, isophthalic acid dihydrazide, 2,6-naphthoic acid dihydrazide, 1,4-naphthoic acid dihydrazide, 2,6-pyridine dihydrazide, 4,4'-bisbenzene dihydrazide, salycylic acid hydrazide, p-hydroxybenzoic acid hydrazide, 1-hydroxy-2-naphthoic acid hydrazide, 2-hydroxy-3-naphthoic acid hydrazide, aminobenzoic acid hydrazide and so on.

As the amine of the formula (V) or the amine constituting the amine addition salt of the formula (VI), mention may be made of decylamine, laurylamine, myristylamine, palmitylamine, stearylamine, behenylamine, oleylamine, monomethyl decylamine, monomethyl laurylamine, monomethyl myristylamine, monomethyl palmitylamine, monomethyl stearylamine, monomethyl oleylamine, monoethyl decylamine, monoethyl laurylamine, monoethyl myristylamine, monoethyl palmitylamine, monoethyl stearylamine, monoethyl oleylamine, monopropyl decylamine, monopropyl laurylamine, monopropyl myristylamine, monopropyl palmitylamine, monopropyl stearylamine, monopropyl oleylamine, dimethyl decylamine, dimethyl laurylamine, dimethyl myristylamine, dimethyl palmitylamine, dimethyl stearylamine, dimethyl oleylamine, diethyl decylamine, diethyl laurylamine, diethyl myristylamine, diethyl palmitylamine, diethyl stearylamine, diethyl oleylamine, methylethyl decylamine, methylethyl laurylamine, methylethyl myristylamine, methylethyl palmitylamine, methylethyl stearylamine, methylethyl oleylamine, di(hydroxyethyl) decylamine, di(hydroxyethyl) laurylamine, di(hydroxyethyl) myristylamine, di(hydroxyethyl) palmitylamine, di(hydroxyethyl) stearylamine, di(hydroxyethyl) oleylamine and so on.

On the other hand, as the carboxylic acid constituting the amine addition salt is a saturated or unsaturated straightchain aliphatic acid having a carbon number of 10–20 as $R^8$. As such a carboxylic acid, mention may be made of capric acid, lauric acid, myristic acid, palmitic acid, stearic acid, arachic acid, behenic acid, oleic acid and so on.

And also, the addition of a thiuram based accelerator contributes to the rise of the vulcanizing rate. Particularly, tetraoctylthiuram disulfide or tetrabenzyl-thiuram disulfide is very effective in a rubber composition using a benzothiazole based accelerator together.

In the rubber composition according to the invention can properly be used a reinforcing resin usually used in rubber for increasing the hardness. As such a reinforcing resin, novolac type phenolic resin or modified polyolefin is favorable. The amount of the reinforcing resin compounded is preferable to be 0.5–10 parts by weight based on 100 parts by weight of the rubber ingredient.

The novolac type phenolic resin includes a novolac type non-modified phenolic resin and a novolac type modified phenolic resin obtained by modifying one with an animal or vegetable oil such as rosin oil, tall oil, cashew nut oil, linseed oil or the like; an unsaturated oil such as linolic acid oil, oleic acid oil, linolenic acid oil or the like; or an aromatic hydrocarbon resin such as xylene, mesitylene or the like.

In case of using the novolac type phenolic resin, it is favorable to further use a methylene donor as a curing agent. As the methylene donor can be used hexamethylene tetramine and a methylolated melamine derivative, which includes, for example, hexamethylol melamine, hexamethoxymethyl melamine, hexaethoxymethyl melamine, hexaquis-(methoxymethyl) melamine, N,N',N"-trimethyl-N, N',N"-trimethylol melamine, N,N',N"-trimethylol melamine, N-methylol melamine, N,N'-(methoxymethyl) melamine, N,N',N"-tributyl-N,N',N"-trimethylol melamine and so on.

And also, the modified polyolefin contains one or more functional groups and is favorable to contain a group derived from anhydrous maleic acid, acrylic acid, epoxide or the like as the functional group. For example, POLYBOND 3009 or 3109 (trade mark, made by Uniroyal Chemical Company) can be used as a modified polyolefin.

When the rubber composition according to the invention is used for a tire case rubber coating a steel member such as wire coating, bead coating or the like, it is preferable to contain an adhesion improving agent.

As the adhesion improving agent, a metal salt of an organic acid, a metal salt of boric acid, a triazine compound, sodium alkylene dithiosulfate and the like are favorable. The amount of the adhesion improving agent compounded is favorable to be 0.3–10 parts by weight based on 100 parts by weight of the rubber ingredient.

In the metal salt of the organic acid, Co and Ni can be used as a metal, and the preferable organic acid includes an aliphatic or alicyclic carboxylic acid having a carbon number of 6–30 such as stearic acid, palmitic acid, neodecanoic acid, versatic acid, oleic acid, linolic acid, linolenic acid, ricinoleic acid, naphthenic acid or the like; and abietic acid and rosin acid.

As the metal salt of boric acid, mention may be made of compounds represented by the following formula (VII):

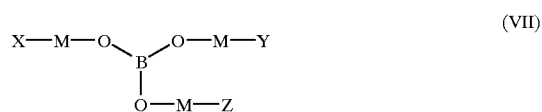

wherein M is Co or Ni, and each of X, Y and Z is a monocarboxylic acid having a carbon number of 7–11. As such a metal salt, there is cobalt (II) boric acid trineodecanoic acid, which is commercially available as Manobond C22.5, trade mark, made by Rhodia, or the like.

A monoalkali metal salt of triazine trithiol can be exemplified as a triazine compound, and sodium 1,6-hexamethylene-dithiosulfate dihydrate, which is commercially available as Duralink HTS, trade mark, made by Flexsys, can be exemplified as a sodium alkylene dithiosulfate.

The rubber composition according to the invention is obtained by kneading the above rubber component, polymaleimide, reinforcing filler and the like in a kneading machine such as rolls, international mixer or the like, and can be used in not only a tire application such as rubber materials for tire tread, under-tread, sidewall, bead portion, coating rubber for carcass and belt, but also application for industrial goods such as rubber insulator, belt hoses and the like when the rubber composition is shaped and vulcanized.

The following examples are given in illustration of the invention and are not intended as limitations thereof.

Various compounding components as shown in Table 1 (for tire tread) and Table 3 (for coating tire cords) are kneaded with a laboratory plastomill of 500 ml and rolls of 3 inches to obtain uncured rubber compositions (Examples 1–10 and Comparative Examples 1–7). With respect to these rubber compositions, rheometer test and blow point test are made by the following methods (1) and (2), and tensile test and dynamic viscoelastic test after the vulcanization of the rubber composition are made by the following methods (3) and (4). Further, adhesion test is made with respect to the rubber compositions by the following method (5). The test results are shown in Tables 2 and 4.

(1) Rheometer Test

A torque is measured at 145° C. by using a tester of MDR 2000, made by Flexsys in USA. $T_{10}$ or $T_{90}$ is a time that the rise of the torque through vulcanization reaction reaches 10% or 90% of a whole, respectively. Each of the data is represented by an index on the basis that Comparative Example 1 or 5 is 100.

(2) Blow Point Test

A blow point property is evaluated by measuring a time taken before the formation of a foam in the rubber composition during vulcanization steps. The measurement is carried out at 170° C. under an activation energy of 20 kcal by using a blow point measuring machine made by Toyo Seiki Co., Ltd. The data are represented by an index on the basis that Comparative Example 1 or 5 is 100. The larger the index value, the larger the blow point value, which means that a longer vulcanizing time is required and the productivity is degraded.

(3) Tensile Test

After the vulcanization at 145° C. for a vulcanizing time corresponding to 1.5 times of $T_{90}$ obtained in the above item (1), the tensile test (using a No. 3 test specimen) is made according to a method of JIS K6301-1975 to measure tensile stress at an elongation of 50% ($M_{50}$). The data are represented by an index on the basis that Comparative Example 1 or 5 is 100.

(4) Dynamic Viscoelastic Test

E' (dynamic storage modulus) and tan δ (loss factor) are measured at a frequency of 52 Hz, a measuring temperature of 30° C. and a strain of 1% by using a spectrometer (a testing mchnie for measuring dynamic viscoelasticity) made by Toyo Seiki Co., Ltd. The data is represented by an index on the basis that Comparative Example 1 or 5 is 100.

(5) Adhesion Test

Steel cords (1×5 construction, filament diameter: 0.25 mm) plated with a brass (Cu: 63 wt %, Zn: 37 wt %) are arranged by side by side at an interval of 12.5 mm and coated with each of the rubber compositions from up-down direction and vulcanized at 160° C. for 20 minutes to prepare a sample of 12.5 mm in width. The initial adhesiveness, adhesiveness aged in the presence of oxygen, and adhesiveness aged under steam aging condition are evaluated according to ASTM D-2229 by pulling out the steel cord from the sample to measure a pulling force. The data are represented by an index on the basis that Comparative Example 1 is 100, wherein the larger the index value, the better the adhesiveness.

The initial adhesiveness is measured just after the vulcanization. The adhesiveness aged in the presence of oxygen is measured after the sample is aged in air at 120° C. for 7 days. The adhesiveness aged under humidity heating condition is measured after the sample is aged under a condition of 70° C. and 100% humidity for 7 days.

Further, each of the rubber compositions of Examples 1 and 3 and

Comparative Examples 1 and 2 is used as a tread rubber to prepare a pneumatic tire having a tire size of 185/70R$^{14}$ and a tread of one-layer structure. The steering performance of the tire is evaluated by an actual running test.

(6) Steering Performance

The tire to be tested is mounted onto a vehicle of FF 4-door sedan and actually run on a test course of dry asphalted road surface, during which traction performance, braking performance, handle responsibility and steering controllability are totally evaluated as a steering performance by a professional test driver at the following four stages when the tire of Comparative Example 1 is a control tire.

+1: The improvement of the steering performance is delicately felt by a professional test driver as compared with the control tire;

+2: The improvement of the steering performance is clearly felt by a professional test driver as compared with the control tire;

+3: The improvement of the steering performance is felt by an ordinary skilled driver as compared with the control tire;

+4: The improvement of the steering performance is felt by an ordinary driver as compared with the control tire.

TABLE 1

(parts by weight)

|  |  | Comparative Example 1 | Comparative Example 2 | Example 1 | Example 2 | Example 3 | Example 4 |
|---|---|---|---|---|---|---|---|
| SBR1500 |  | 100.0 | 100.0 | 100.0 | 100.0 | 100.0 | 100.0 |
| Carbon black | Seast 3H(ISAF), made by Tokai Carbon Co., Ltd. | 65.0 | 65.0 | 65.0 | 65.0 | 65.0 | 65.0 |
| Silica | Nipsil AQ, made by Nippon Silica Kogyo Co., Ltd. |  |  |  |  |  |  |
| Silane coupling agent | Si 69, made by Degussa AG |  |  |  |  |  |  |
| Aromatic oil |  | 30.0 | 30.0 | 30.0 | 30.0 | 30.0 | 30.0 |
| Stearic acid |  | 2.0 | 2.0 | 2.0 | 2.0 | 2.0 | 2.0 |
| Zinc white |  | 3.0 | 3.0 | 3.0 | 3.0 | 3.0 | 3.0 |
| Antioxidant | Nocrac 6C, made by Ohuchi Shinko Kagaku Kogyo Co., Ltd. | 1.0 | 1.0 | 1.0 | 1.0 | 1.0 | 1.0 |
| Vulcanization accelerator | Noccelar D, made by Ohuchi Shinko Kagaku Kogyo Co., ltd. | 0.3 | 0.3 | 0.3 | 0.3 | 0.3 | 0.3 |
| Vulcanization accelerator | Noccler NS, made by Ohuchi Shinko Kagaku Kogyo Co., Ltd. | 1.0 | 1.0 | 1.0 | 1.0 | 1.0 | 1.0 |
| Vulcanization accelerator | hydrazide *1 |  |  |  |  | 1.2 |  |
| Reinforcing resin | POLYBOND |  |  |  |  |  | 1.2 |
| Bismaleimide *2 | BMI-S, made by Mitsui Chemicals, Inc. |  | 2.0 |  |  |  |  |
| Polymaleimide *3 |  |  |  | 2.0 | 1.2 | 1.2 | 1.2 |
| Sulfur |  | 1.8 | 1.8 | 1.8 | 1.8 | 1.8 | 1.8 |

|  |  | Comparative Example 3 | Comparative Example 4 | Example 5 | Example 6 | Example 7 | Example 8 |
|---|---|---|---|---|---|---|---|
| SBR1500 |  | 100.0 | 100.0 | 100.0 | 100.0 | 100.0 | 100.0 |
| Carbon black | Seast 3H(ISAF), made by Tokai Carbon Co., Ltd. | 35.0 | 35.0 | 35.0 | 35.0 | 35.0 | 35.0 |
| Silica | Nipsil AQ, made by Nippon Silica Kogyo Co., Ltd. | 30.0 | 30.0 | 30.0 | 30.0 | 30.0 | 30.0 |
| Silane coupling | Si 69, made by Degussa AG | 3.0 | 3.0 | 3.0 | 3.0 | 3.0 | 3.0 |

TABLE 1-continued (parts by weight)

| agent | | | | | | | |
|---|---|---|---|---|---|---|---|
| Aromatic oil | | 30.0 | 30.0 | 30.0 | 30.0 | 30.0 | 30.0 |
| Stearic acid | | 2.0 | 2.0 | 2.0 | 2.0 | 2.0 | 2.0 |
| Zinc white | | 3.0 | 3.0 | 3.0 | 3.0 | 3.0 | 3.0 |
| Antioxidant | Nocrac 6C, made by Ohuchi Shinko Kagaku Kogyo Co., Ltd. | 1.0 | 1.0 | 1.0 | 1.0 | 1.0 | 1.0 |
| Vulcanization accelerator | Noccelar D, made by Ohuchi Shinko Kagaku Kogyo Co., ltd. | 0.6 | 0.6 | 0.6 | 0.6 | 0.6 | 0.6 |
| Vulcanization accelerator | Noccler NS, made by Ohuchi Shinko Kagaku Kogyo Co., Ltd. | 1.0 | 1.0 | 1.0 | 1.0 | 1.0 | 1.0 |
| Vulcanization accelerator | hydrazide *1 | | | | | 1.2 | |
| Reinforcing resin | POLYBOND | | | | | | 1.2 |
| Bismaleimide *2 | BMI-S, made by Mitsui Chemicals, Inc. | | 2.0 | | | | |
| Polymaleimide *3 | | | | 2.0 | 1.2 | 1.2 | 1.2 |
| Sulfur | | 1.8 | 1.8 | 1.8 | 1.8 | 1.8 | 1.8 |

*1: 3-hydroxy-N'-(1,3-dimethylbutylidene)-2-naphthoic acid hydrazide
*2: N,N'-(4,4'-diphenylmethane)bismaleimide
*3: 67.0 wt % of binuclide and the balance is substantially trinuclide or more

TABLE 2

| | | Comparative Example 1 | Comparative Example 2 | Example 1 | Example 2 | Example 3 | Example 4 | Comparative Example 3 | Comparative Example 4 | Example 5 | Example 6 | Example 7 | Example 8 |
|---|---|---|---|---|---|---|---|---|---|---|---|---|---|
| Rheometer test | $T_{10}$ | 100 | 108 | 107 | 102 | 97 | 102 | 100 | 106 | 106 | 102 | 100 | 103 |
| | $T_{90}$ | 100 | 145 | 140 | 118 | 103 | 120 | 100 | 170 | 167 | 117 | 105 | 120 |
| Blow point test | | 100 | 151 | 142 | 111 | 99 | 109 | 100 | 195 | 189 | 119 | 103 | 122 |
| Tensile test | $M_{50}$ | 100 | 131 | 155 | 140 | 160 | 167 | 100 | 138 | 165 | 140 | 160 | 176 |
| Dynamic viscoelastic test | E' | 100 | 134 | 159 | 131 | 165 | 183 | 100 | 146 | 179 | 148 | 171 | 182 |
| | tan δ | 100 | 90 | 89 | 89 | 83 | 92 | 100 | 93 | 89 | 90 | 86 | 91 |
| Steering performance | | control | +2 | +3 | — | +3 | — | — | — | — | — | — | — |

TABLE 3

| | | Comparative Example 5 | Comparative Example 6 | Example 9 | Comparative Example 7 | Example 10 | Example 11 | Example 12 |
|---|---|---|---|---|---|---|---|---|
| NR | | 100.0 | 100.0 | 100.0 | 100.0 | 100.0 | 100.0 | 100.0 |
| Carbon black | Asahi #70 (N330) made by Asahi Carbon Co., Ltd. | 60.0 | 60.0 | 60.0 | 60.0 | 60.0 | 60.0 | 60.0 |
| Zinc white | | 8.0 | 8.0 | 8.0 | 8.0 | 8.0 | 8.0 | 8.0 |
| Antioxidant | Nocrac 6C, made by Ohuchi Shinko Kagaku Kogyo Co., Ltd. | 2.0 | 2.0 | 2.0 | 2.0 | 2.0 | 2.0 | 2.0 |
| Vulcanization accelerator | Noccelar DZ, made by Ohuchi Shinko Kagaku Kogyo Co., Ltd. | 1.0 | 1.0 | 1.0 | 1.0 | 1.0 | 1.0 | 1.0 |
| Reinforcing resin *1 | PR50235, made by Sumitomo Dules Co., Ltd. | | | | 2.0 | 2.0 | 2.0 | 2.0 |
| Curing agent | Hexamethylene tetramine | | | | 0.5 | 0.5 | 0.5 | 0.5 |
| Adhesion improving agent | Monobond C22.5, made by Rhodia Inc. | 0.9 | 0.9 | 0.9 | 0.9 | 0.9 | 0.9 | 0.9 |
| Sulfur | | 5.0 | 5.0 | 5.0 | 5.0 | 5.0 | 5.0 | 5.0 |
| Bismaleimide *2 | BMI-S, made by Mitsui Chemicals, Inc. | | 1.5 | | 1.0 | | | |
| Polymaleimide *3 | | | | 0.9 | | 0.6 | | |
| Polymaleimide *4 | | | | | | | 0.9 | |
| Polymaleimide *5 | | | | | | | | 0.9 |

*1: Novolac type unmodified phenol resin
*2: N,N'-(4,4'-diphenylmethane)bismaleimide
*3: 67.0 wt % of binuclide and the balance is substantially trinuclide or more
*4: 72.0 wt % of binuclide and the balance is substantially trinuclide or more
*5: 77.0 wt % of binuclide and the balance is substantially trinuclide or more

TABLE 4

|  |  | Comparative Example 5 | Comparative Example 6 | Example 9 | Comparative Example 7 | Example 10 | Example 11 | Example 12 |
|---|---|---|---|---|---|---|---|---|
| Rheometer | $T_{10}$ | 100 | 110 | 103 | 118 | 106 | 102 | 104 |
|  | $T_{90}$ | 100 | 128 | 108 | 134 | 110 | 108 | 110 |
| Blow point test |  | 100 | 121 | 104 | 119 | 105 | 107 | 107 |
| Tensile test | $M_{50}$ | 100 | 141 | 148 | 211 | 215 | 143 | 140 |
| Dynamic viscoelastic test | E' | 100 | 158 | 162 | 242 | 244 | 158 | 161 |
|  | tan δ | 100 | 95 | 93 | 193 | 163 | 94 | 97 |
| Adhesiont est | initial adhesiveness | 100 | 110 | 117 | 128 | 132 | 117 | 112 |
|  | in the presence of oxygen | 100 | 122 | 128 | 140 | 145 | 127 | 123 |
|  | under humidity heating condition | 100 | 124 | 127 | 140 | 148 | 126 | 125 |

As seen from Tables 1 and 2, when Comparative Examples 1 and 2 are compared with Comparative Examples 3 and 4, the elastic modulus ($M_{50}$ and E') is largely increased by adding a bismaleimide compound, but the vulcanizing time ($T_{10}$, $T_{90}$) is prolonged to degrade the result of the blow point test and hence the productivity is lowered.

When a polymaleimide is used in an amount equal to that of bismaleimide, it is possible to improve the elastic modulus and tire performances without further lowering the productivity as seen from Examples 1 and 5.

In case of using a polymaleimide, the amount of the polymaleimide required for obtaining the elastic modulus at the same level as in the rubber composition containing bismaleimide becomes less and hence it is possible to improve the productivity while maintaining the good elastic modulus and tire performances (see Examples 2 and 6). And also, the amount of expensive polymaleimide added can be decreased, which brings about the reduction of the product cost.

Further, a hydrazide compound is added to promote the vulcanization reaction, whereby it is possible to improve the blow point property (see Examples 3 and 7).

Furthermore, it is possible to improve the elastic modulus and to maintain the productivity by using a reinforcing resin together (see Examples 4 and 8). Moreover, the compounding preferentially taking either the improvement of the elastic modulus or the maintenance of the productivity is determined by the performances required for the tire.

As seen from Tables 3 and 4, the addition of the bismaleimide compound improves the elastic modulus but sacrifices the productivity (see Comparative Examples 5 and 6).

On the other hand, when utilizing the characteristic of a polymaleimide that the elastic modulus is largely improved, even if the amount of the poly-maleimide added is decreased, the productivity is improved while ensuring the improvement of the elastic modulus at the same level as in the case of using a bismaleimide compound (see Example 9). And also, it is possible to further improve the productivity by using a reinforcing resin together (see Example 10).

As mentioned above, according to the invention, the performances such as elastic modulus and the like can be improved without damaging the productivity and also the cost can be reduced.

What is claimed is:

1. A rubber composition comprising at least one rubber ingredient selected from natural rubber and synthetic rubbers, and a polymaleimide synthesized by reacting at least one of anhydrous maleic acid and anhydrous citraconic acid with methylene polyaniline represented by the following formula (I):

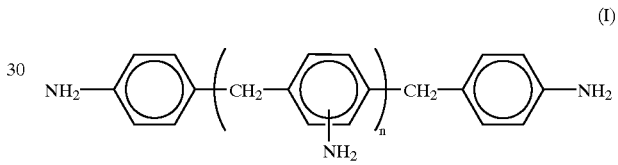

(I)

wherein n is an integer of 1 or more.

2. A rubber composition according to claim 1, wherein the polymaleimide is compounded in an amount of 0.1–10 parts by weight based on 100 parts by weight of the rubber ingredient.

3. A rubber composition according to claim 1, wherein the methylene polyaniline contains 30–95% by weight of a binuclide component and 5–70% by weight of trinuclide or larger components (components at n=1 or more in the formula (I)).

4. A rubber composition according to claim 3, wherein the methylene polyaniline contains 60–90% by weight of the binuclide component and 10–40% by weight of the trinuclide or more components.

5. A rubber composition according to claim 1, wherein the rubber ingredient contains not less than 50% by weight of styrene-butadiene copolymer.

6. A rubber composition according to claim 1, wherein the rubber ingredient contains not less than 50% by weight of natural rubber.

* * * * *